US008972099B2

(12) United States Patent
Ghoneim

(10) Patent No.: US 8,972,099 B2
(45) Date of Patent: Mar. 3, 2015

(54) METHOD AND APPARATUS FOR ON-BOARD/OFF-BOARD FAULT DETECTION

(71) Applicant: GM Global Technology Operations LLC, Detroit, MI (US)

(72) Inventor: Youssef A. Ghoneim, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 88 days.

(21) Appl. No.: 13/759,389

(22) Filed: Feb. 5, 2013

(65) Prior Publication Data

US 2014/0222281 A1  Aug. 7, 2014

(51) Int. Cl.
*G06F 17/00* (2006.01)
*G01M 17/00* (2006.01)
*G06F 7/00* (2006.01)

(52) U.S. Cl.
CPC ..................................... *G06F 17/00* (2013.01)
USPC ....................................................... 701/31.4

(58) Field of Classification Search
CPC .......... G07C 5/00; G07C 5/008; G07C 5/006; G07C 5/08; G07C 5/0808; G07C 5/0816; G07C 5/085
USPC ........... 701/29.1, 29.6, 29.7, 31.4, 31.6, 31.7, 701/32.7
See application file for complete search history.

(56) References Cited

U.S. PATENT DOCUMENTS

| | | | |
|---|---|---|---|
| 6,766,230 B1 * | 7/2004 | Rizzoni et al. ............... 701/32.9 |
| 7,533,322 B2 * | 5/2009 | Bauerle et al. ................ 714/763 |
| 7,539,549 B1 * | 5/2009 | Discenzo et al. .............. 700/28 |
| 8,095,261 B2 * | 1/2012 | Howell et al. ................ 701/29.1 |
| 2004/0073843 A1 * | 4/2004 | Dean et al. ........................ 714/37 |
| 2007/0101236 A1 * | 5/2007 | Bauerle et al. ................ 714/763 |
| 2008/0097662 A1 * | 4/2008 | Volponi .......................... 701/29 |
| 2009/0177354 A1 * | 7/2009 | Agrawal et al. ................. 701/35 |
| 2009/0254240 A1 * | 10/2009 | Olsen, III et al. .............. 701/30 |
| 2010/0063668 A1 * | 3/2010 | Zhang et al. .................... 701/30 |

FOREIGN PATENT DOCUMENTS

WO    PCT/US12/52771    8/2012

OTHER PUBLICATIONS

U.S. Appl. No. 13/400,216, filed Feb. 20, 2012, Ghoneim, Youssef A., Unpubl.
U.S. Appl. No. 13/288,073, filed Nov. 3, 2012, Ghoneim, Youssef A., Unpubl.

* cited by examiner

Primary Examiner — Mary Cheung
Assistant Examiner — Annie Mazzara

(57) ABSTRACT

A method for monitoring a subsystem of a subject vehicle includes, in an off-board environment, executing a controller-based scheme. The scheme includes determining a plurality of residuals based upon expected and observed states of parameters associated with operation of the subsystem, determining a subsystem operating signature based upon the residuals, employing the subsystem operating signature to isolate a subsystem fault, and communicating the subsystem fault to an on-board controller of the subject vehicle.

16 Claims, 7 Drawing Sheets

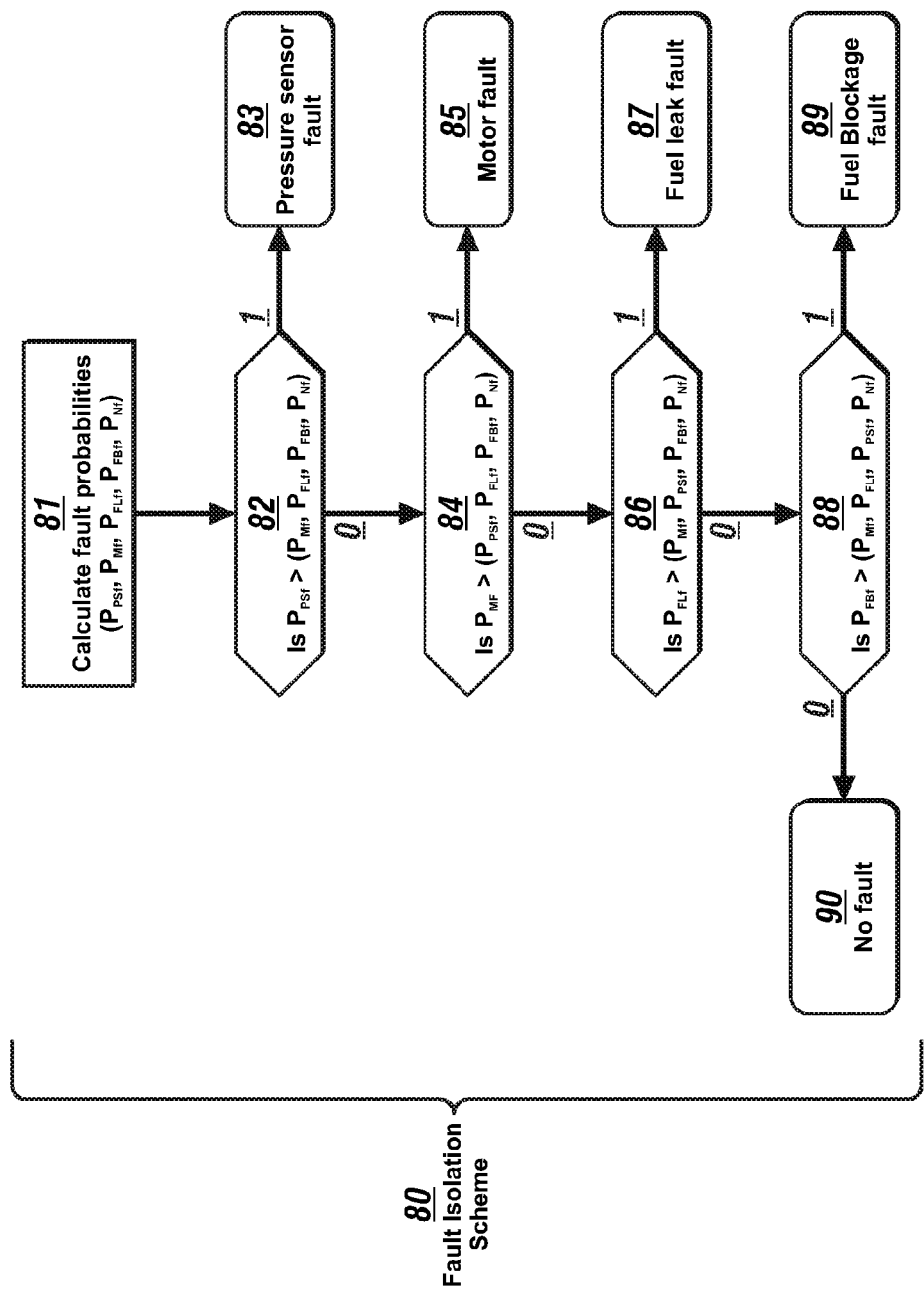

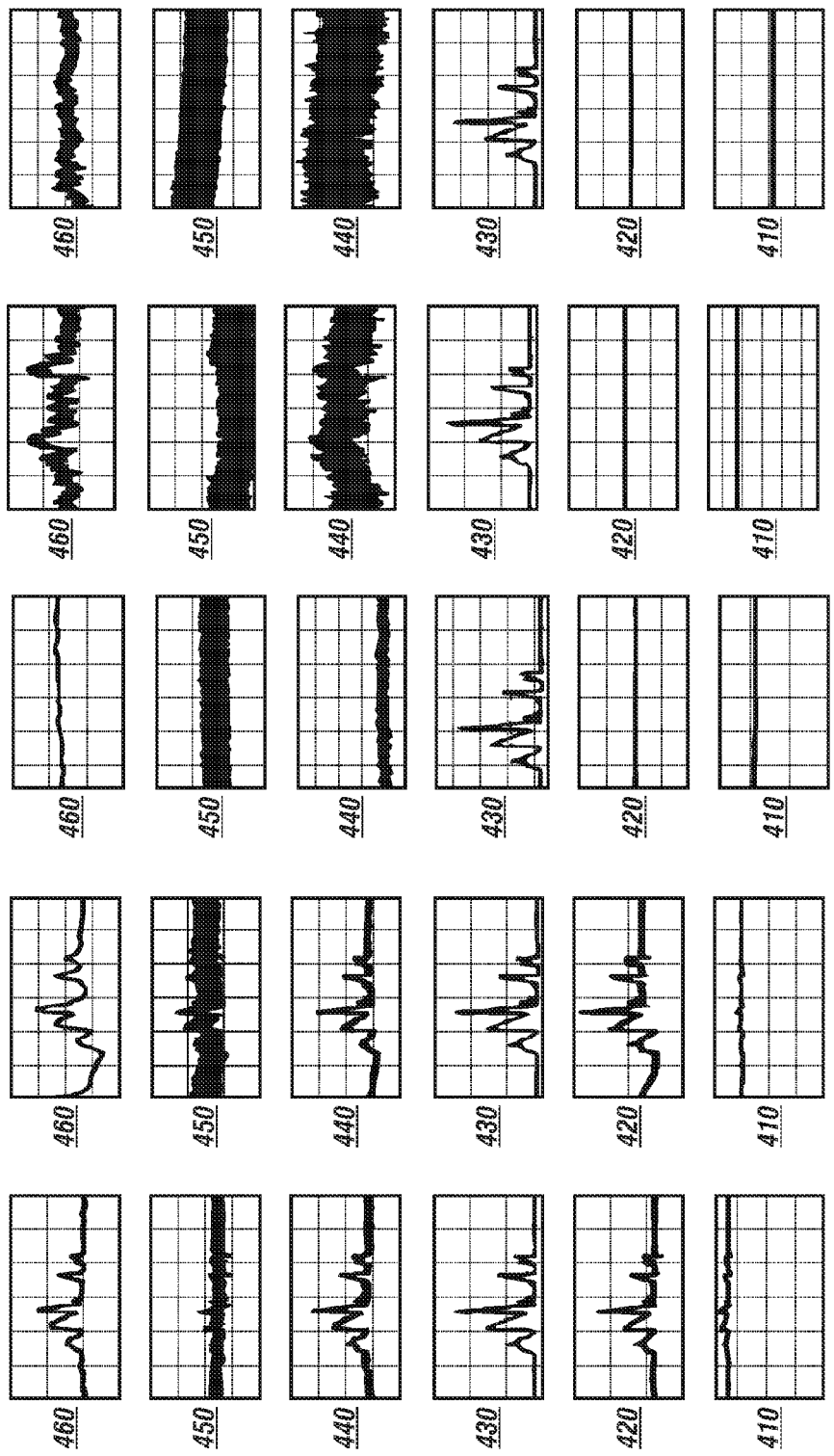

METHOD AND APPARATUS FOR ON-BOARD/OFF-BOARD FAULT DETECTION

TECHNICAL FIELD

This disclosure is related to vehicle systems monitoring, diagnostics and fault detection.

BACKGROUND

The statements in this section merely provide background information related to the present disclosure. Accordingly, such statements are not intended to constitute an admission of prior art.

On-board monitoring systems execute routines that monitor states of parameters to detect presence of a fault and identify a location of any detected fault. On-board monitoring systems are constrained by available memory space, communications, and execution resources in on-board controllers. Known on-board systems permit communications between vehicle systems and remote facilities.

Known diagnostic techniques for a vehicle subsystem rely on knowledge of prior fault conditions to diagnose and repair a fault. For example, when servicing the vehicle, a maintenance technician may determine by direct testing and/or review of a recorded diagnostic code that there is a fault in a fuel pump requiring repair or replacement. This reactive diagnosis may not occur until vehicle performance has already been compromised.

SUMMARY

A method for monitoring a subsystem of a subject vehicle includes, in an off-board environment, executing a controller-based scheme. The scheme includes determining a plurality of residuals based upon expected and observed states of parameters associated with operation of the subsystem, determining a subsystem operating signature based upon the residuals, employing the subsystem operating signature to isolate a subsystem fault, and communicating the subsystem fault to an on-board controller of the subject vehicle.

BRIEF DESCRIPTION OF THE DRAWINGS

One or more embodiments will now be described, by way of example, with reference to the accompanying drawings, in which:

FIG. 2 illustrates an embodiment of an electronic returnless fuel subsystem configured to deliver pressurized fuel to an internal combustion engine in accordance with the disclosure;

FIG. 3-1 illustrates data including pump current in relation to fuel pressure for a plurality of pump voltage commands during operation of an electronic returnless fuel system (RFS) under standardized ambient conditions in accordance with the disclosure;

FIG. 3-2 illustrates data including pump speed in relation to fuel pressure for a plurality of pump voltage commands during operation of an electronic returnless fuel system (RFS) under standardized ambient conditions in accordance with the disclosure; and FIGS. 4-1 through 4-5 illustrate raw data associated with operating an embodiment of an electronic returnless fuel system (RFS), including pump speed (rad/sec), pump voltage (V), commanded pressure (kPa), actual pressure (kPa), pump flowrate (L/h), and pump current (A) in accordance with the disclosure.

DETAILED DESCRIPTION

Figure 1:
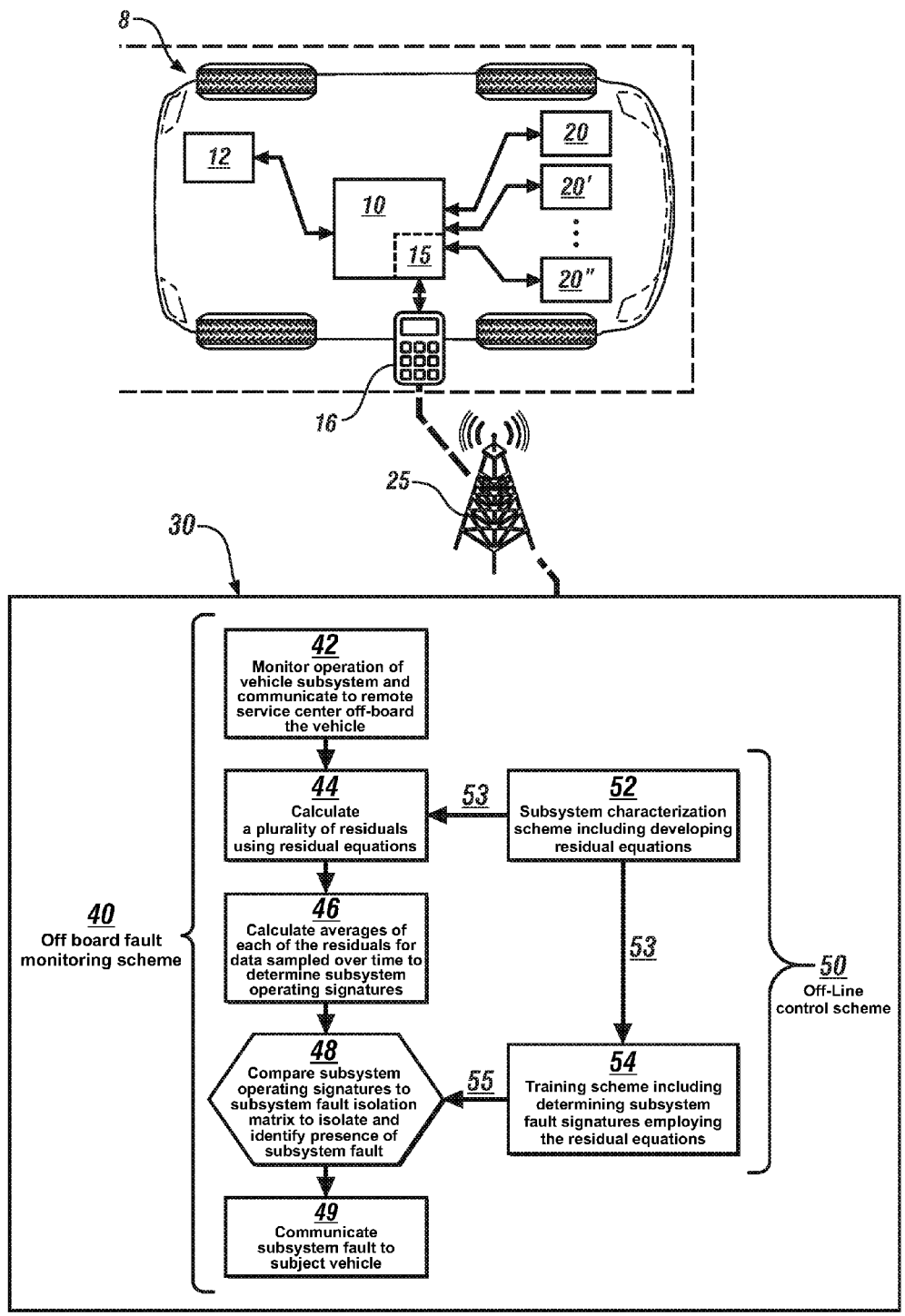
FIGS. 1-1, 1-2, and 1-3 illustrate a vehicle signally connected to a remote subsystem monitoring system via a wireless communication transmission system including an off-board fault monitoring scheme in accordance with the disclosure.
Figures 1, 2:
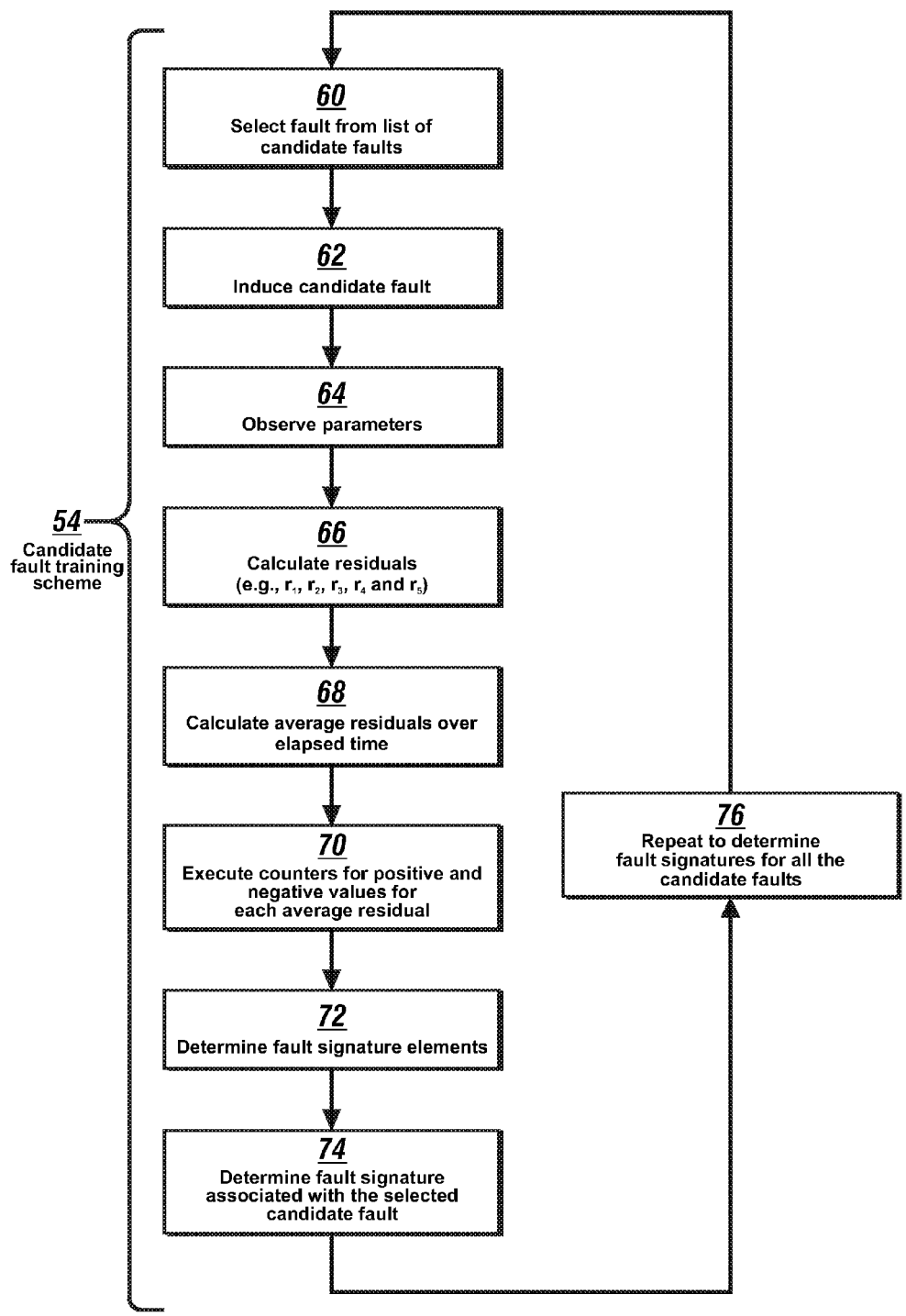
Figure 2:
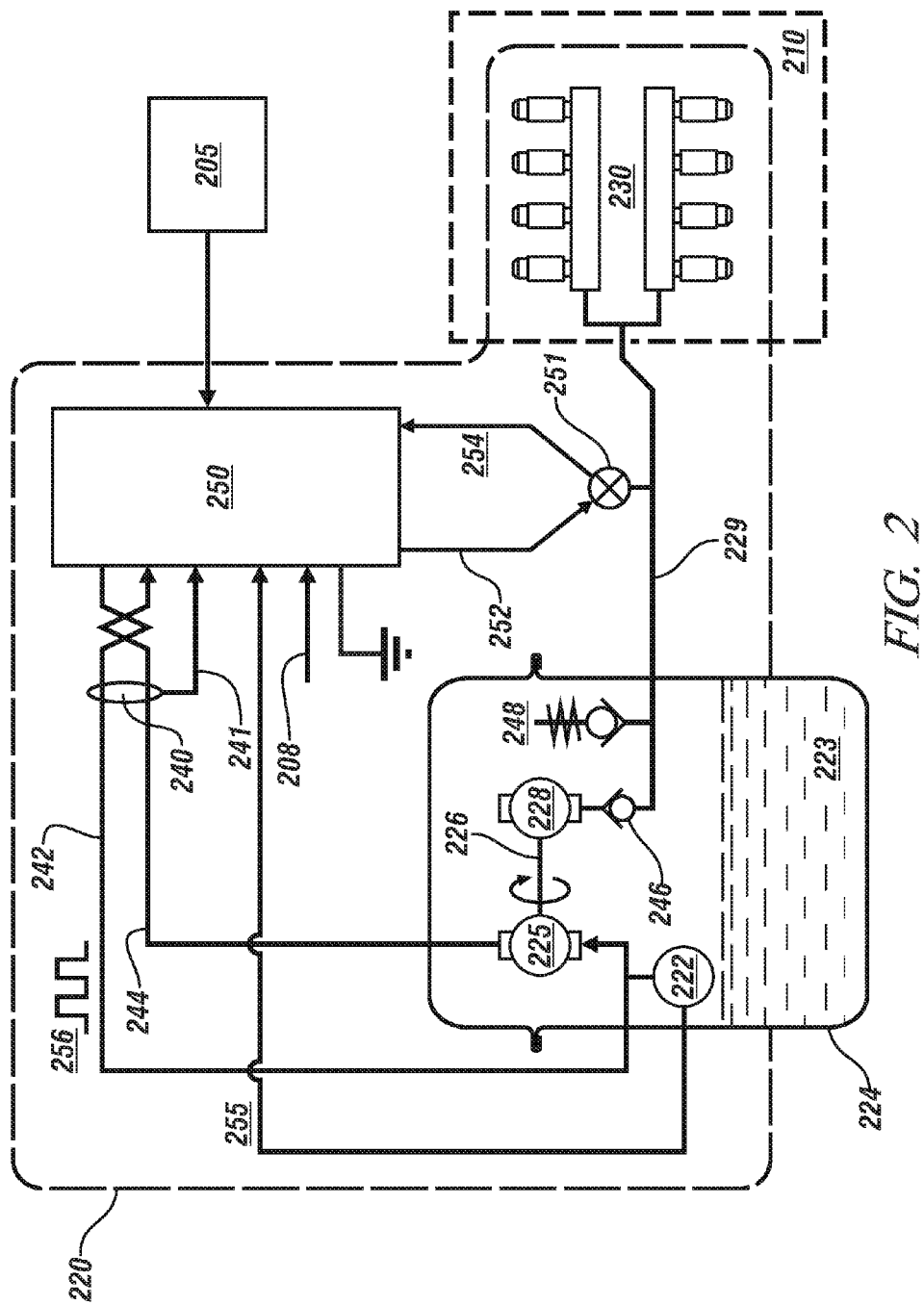
Figures 1, 3:
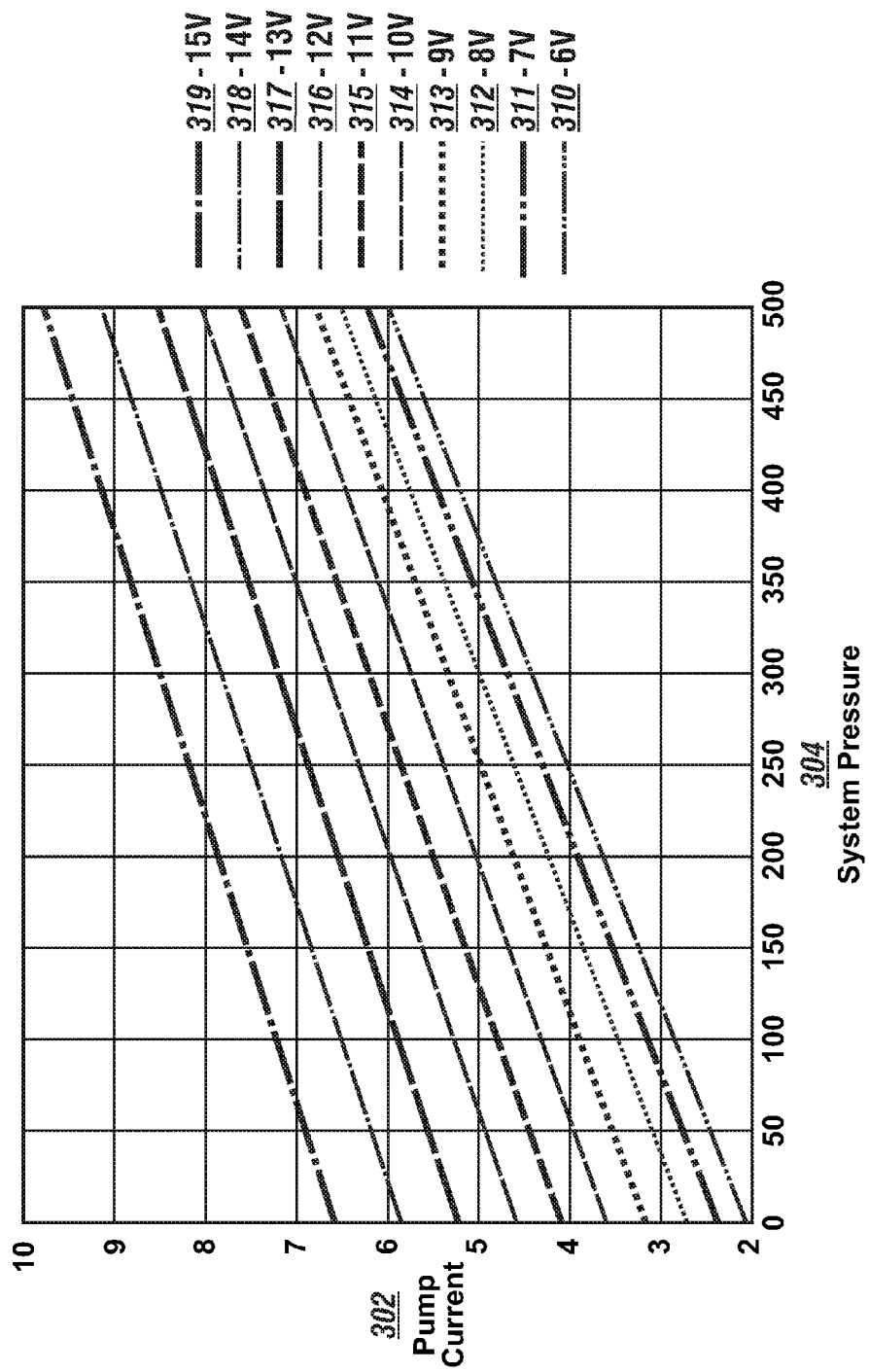
Figures 2, 3:
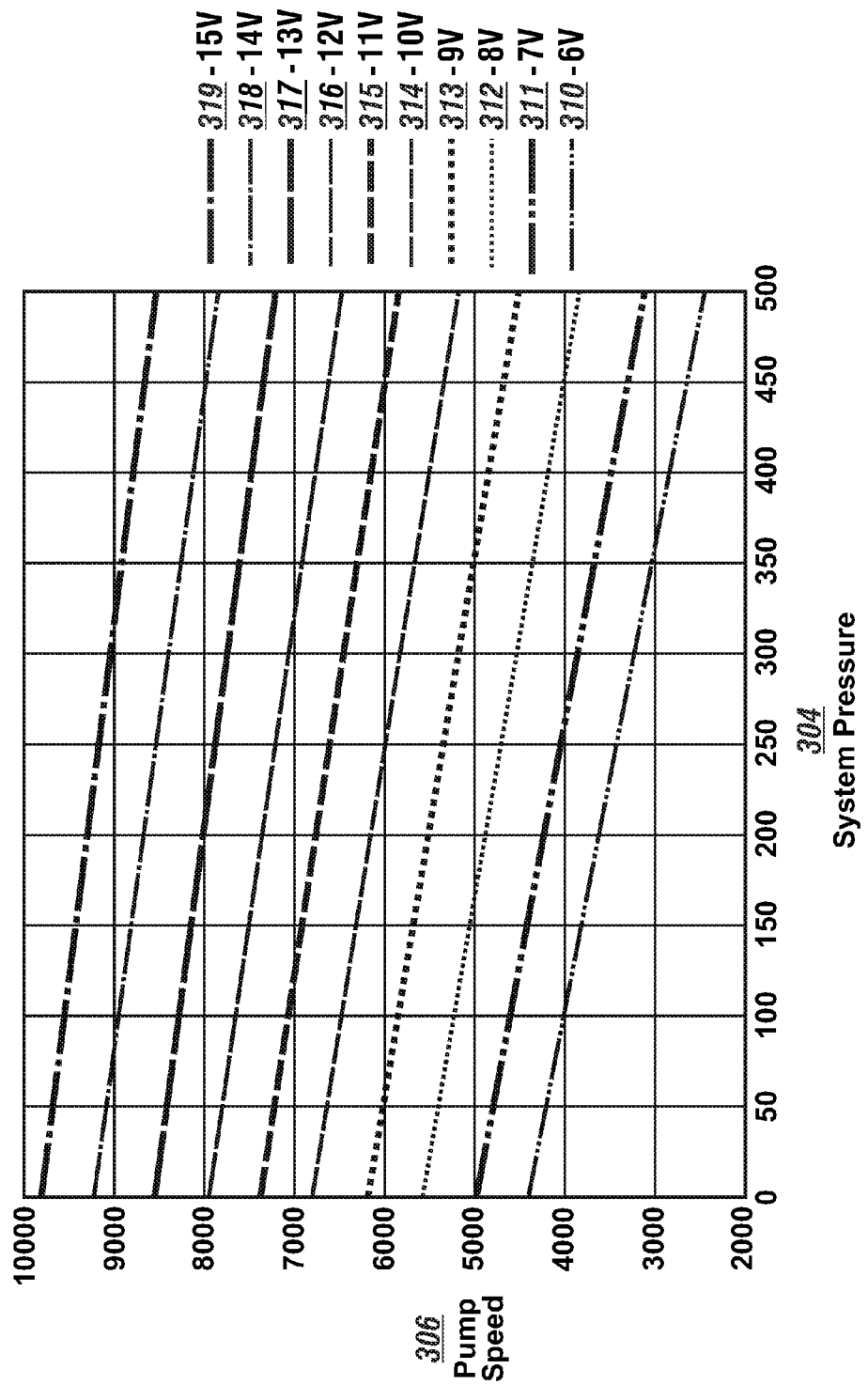

Referring now to the drawings, wherein the showings are for the purpose of illustrating certain exemplary embodiments only and not for the purpose of limiting the same, FIGS. 1-1, 1-2, and 1-3 schematically illustrate a subject vehicle 8 including a controller 10 that signally connects to a remote service center 30 via a wireless communication transmission system 25. The remote service center 30 executes an off-board fault monitoring scheme 40 and an off-line control scheme 50. The subject vehicle 8 may include any vehicle, and in one embodiment is a passenger vehicle providing ground transportation. The subject vehicle 8 preferably has a propulsion system that converts energy to torque to provide propulsion power to one or more vehicle wheels.

The controller 10 includes control schemes 15 and signally and operatively connects to a plurality of subsystems 20, 20' ... 20", an extra-vehicle communications system 16, and a human/machine interface (HMI) device 12. The subsystems 20, 20' ... 20" preferably include devices and associated control elements that provide various vehicle functions including, e.g., functions related to vehicle propulsion, ride/handling, and HVAC, among others. One of the subsystems 20, 20' ... 20" is a returnless fuel management system described herein with reference to FIG. 2. The HMI device 12 preferably includes a visual display system, e.g., a multi-function dashboard that is employed to communicate vehicle operating information to a vehicle operator. The HMI device 12 includes a malfunction indicator lamp (MIL) and related information for communicating presence of an on-board fault to the operator.

The wireless communications system 16 is employed to effect extra-vehicle communications, including communication via the wireless communication transmission system 25 to the remote service center 30. In one embodiment, the wireless communications system 16 includes a wireless telematics communications system capable of short-range wireless communications to a handheld device, e.g., a cell phone. In one embodiment the handheld device is loaded with a software application that includes a wireless protocol to communicate with the controller 10, and the handheld device executes the extra-vehicle communications, including communication to the remote service center 30 via the wireless communication transmission system 25.

The controller 10 regularly communicates with the remote service center 30. Information communicated from the controller 10 includes parametric data representing operation of the subsystems 20, 20' ... 20" and vehicle identification information including vehicle identification information in the form of vehicle make, model, model year, VIN, and/or other pertinent data.

The off-board fault monitoring scheme 40 and the off-line control scheme 50 are configured to provide data management and analytical functions associated with detecting and isolating a fault in one of the subsystems 20, 20' ... 20". Table 1 is provided as a key wherein the numerically labeled blocks and the corresponding functions of the off-board fault monitoring scheme 40 and the off-line control scheme 50 are set forth as follows.

TABLE 1

| BLOCK | BLOCK CONTENTS |
|---|---|
| 40 | Off-board fault monitoring scheme |
| 42 | Monitor operation of vehicle subsystem and communicate to remote service center off-board the vehicle |
| 44 | Calculate a plurality of residuals based upon the observed and expected states for the parameters using residual equations |
| 46 | Calculate averages of each of the residuals for data sampled over time to determine subsystem operating signatures |
| 48 | Compare subsystem operating signatures to subsystem fault isolation matrix to isolate and identify presence of subsystem fault |
| 49 | Communicate subsystem fault to subject vehicle |
| 50 | Off-Line control scheme |
| 52 | Subsystem characterization scheme including developing residual equations |
| 54 | Training scheme including determining subsystem fault signatures employing the residual equations |

The off-line control scheme 50 is described first, and the off-board fault monitoring scheme 40 is described in context of the off-line control scheme 50. The off-line control scheme 50 includes operations that can be executed at any time, including operations that are executed prior to deploying a specific vehicle line, operations that are executed prior to deploying a specific vehicle and operations that are executed during the service life of a specific vehicle line and a specific vehicle. The off-line control scheme 50 can operate when a specific vehicle is in an off state, or when a specific vehicle is operating. The off-line control scheme 50 supplies information to the off-board fault monitoring scheme 40 to enable the off-board fault monitoring scheme 40 to provide functionality to the subject vehicle 8. The information supplied to the subject vehicle by the off-line control scheme 50 may be refreshed and updated to reflect changes associated with learned information.

The off-line control scheme 50 includes a subsystem characterization scheme (52) that includes characterizing one of the subsystems 20, 20' . . . 20" in terms of commanded parameters, expected parameters, and observed parameters. The expected parameters include expected states for operating parameters of one of the subsystems in response to the commanded parameters. The observed parameters include actual states for the operating parameters of the one of the subsystems in response to the commanded parameters, and may be monitored directly or estimated employing known parameter estimation techniques. A plurality of residual equations 53 are developed based upon the observed parameters and the expected parameters. The residual equations 53 are employed to determine a plurality of residuals. The off-line control scheme 50 employs the residual equations 53 to develop a subsystem fault training scheme (54) that determines a subsystem fault isolation matrix 55 that can be employed to detect presence of a subsystem fault and isolate a location and/or a source of the subsystem fault, including determining a plurality of subsystem fault signatures employing the residual equations 53, as described herein.

The residual equations 53 are developed for each vehicle subsystem based upon relationships between expected and observed parameters of the subject subsystem 20. This includes testing the subject subsystem under known operating and ambient conditions, and gathering and analyzing data associated therewith. By way of example, an electric motor can be characterized in terms of electrical voltage, electrical current, rotational position and/or speed, torque or load, and ambient temperature. When the electric motor is employed to power a fluidic pump as part of the subsystem 20, hydraulic pressure and/or flowrate may be substituted in place of the torque or load. The relationships between the commanded parameter of electrical voltage and the expected and/or observed parameters of electrical current, rotational position and/or speed, torque or load, and ambient temperature are used as the basis for one or more residual equations 53. A skilled practitioner is able to characterize vehicle subsystems and develop residual equations based upon relationships between commanded parameters, expected parameters and observed parameters of interest for each of a plurality of subsystems.

Exemplary residual equations 53 include as follows for an embodiment of an electronic returnless fuel system. The electronic returnless fuel system is a non-limiting example of a subsystem that is employed to illustrate the concepts described. By way of example, FIG. 2 schematically depicts an embodiment of an electronic returnless fuel system (RFS) 220 that is configured to deliver pressurized fuel to engine fuel injectors of an internal combustion engine, and FIGS. 3-1, 3-2, and 3-3 show exemplary subsystem characterizations of an embodiment of the RFS 220. Exemplary residual equations 53 for an embodiment of the RFS 220 include the following:

$$r_1 = V_s - (I_s R_m + K_m \omega_{m\_obs})$$

$$r_2 = V_s - (I_m R_{m\_est} + K_m \omega_m)$$

$$r_3 = (I_s - I_m)$$

$$r_4 = V_s - (I_m R_{m\_est} + K_m \omega_{m\_obs})$$

$$r_5 = I_m R_m - I_s R_{m\_est} \qquad [1]$$

wherein $R_m$ = Nominal value of pump motor resistance
$R_{m\_est}$ = Estimated actual pump motor resistance,
$K_m$ = Nominal value of pump motor back EMF,
$\omega_m$ = Modeled pump speed,
$I_m$ = Modeled pump current,
$P_s$ = Measured pump pressure,
$V_s$ = Measured pump voltage,
$I_s$ = Measured pump current, and
$\omega_{m\_obs} = \omega_{m\_est}$ = Estimated pump speed.

The modeled pump current $I_m$ and modeled pump speed $\omega_m$ are determined as described herein with reference to EQS. 10 and 11. The value for each of the residuals $r_1$, $r_2$, $r_3$, $r_4$ and $r_5$ is preferably equal to zero under known, preset operating conditions when a subject vehicle subsystem, e.g., an electronic returnless fuel system is operating in accordance with its design and operating parameters.

The subsystem fault training scheme (54) employs the residual equations 53 to determine the subsystem fault isolation matrix 55 including a plurality of fault signatures for the subsystem faults for the selected subsystem 20, which can be employed to detect presence of a subsystem fault and isolate a location and/or a source of the subsystem fault. This includes initially identifying and isolating candidate faults that affect operation or performance of the subsystem 20, or affect operation of a related system. Exemplary candidate faults associated with an electronic returnless fuel system include a pressure sensor fault, a motor resistance fault, an in-system fuel leak, and a blocked filter. A fault isolation database is developed that includes the commanded and observed parameters, e.g., electrical voltage, electrical current, rotational position and/or speed, and torque or load, in relation to one or more of the candidate faults. The specific candidate faults can be identified using experiential knowledge, failure-mode effects analyses, and other methods. Developing the fault isolation database can include inducing known magnitudes of one of the faults in a known system and monitoring and collecting data for the commanded and observed parameters of interest.

FIG. 1-2 shows one embodiment of the candidate fault training scheme (54) that executes to determine a fault signature for each of the candidate faults for a selected subsystem. Table 2 is provided as a key wherein the numerically labeled blocks and the corresponding functions are set forth as follows.

TABLE 2

| BLOCK | BLOCK CONTENTS |
|---|---|
| 54 | Candidate fault training scheme |
| 60 | Select fault from list of candidate faults |
| 62 | Induce candidate fault |
| 64 | Observe parameters |
| 66 | Calculate residuals (e.g., $r_1$, $r_2$, $r_3$, $r_4$ and $r_5$) |
| 68 | Calculate average residuals over elapsed time |
| 70 | Execute counters for positive and negative values for each average residual |
| 72 | Determine fault signature elements |
| 74 | Determine fault signature associated with the selected candidate fault |
| 76 | Repeat to determine fault signatures for all the candidate faults |

The candidate fault training scheme executes to determine fault signatures for all the candidate faults. A list of candidate faults is generated and one of the candidate faults is selected (62). The selected candidate fault is induced in a representative subsystem under known operating and ambient conditions in response to known commanded parameters (62) and previously identified parameters are observed (64). Residuals, e.g., $r_1$, $r_2$, $r_3$, $r_4$ and $r_5$, are calculated using the residual equations, e.g., the residual equations 53 described in EQ. 1 (66). Preferably a suitable quantity of data samples is collected. Average values for each of the residuals (e.g., $a_{v1}$, $a_{v2}$, $a_{v3}$, $a_{v4}$ and $a_{v5}$) are calculated (68), as follows.

$$\text{for} \quad [2]$$
$$i = 1, 5$$
$$n = 1, N (N \text{ is the number of data sample collected})$$
$$a_{vi}(n) = \frac{n}{n+1} a_{vi}(n-1)$$

Counters are employed to determine a quantity of positive values $s_{i(+)}$ and a quantity of negative values $s_{i(-)}$ for each of the average residuals (e.g., $a_{v1}$, $a_{v2}$, $a_{v3}$, $a_{v4}$ and $a_{v5}$) for the sampled data (70). The counters are determined as follows.

For $i=1,5$ $s_i(+)=0$ $s_i(-)=0$

For $j=1,N$

If $a_{vi}(j) \geq \epsilon_i(i_+)$ $S_i(+)=s_i(+)+1$

ElseIF

If $a_{vi}(j) \leq -\epsilon_i(i_-)$ $s_i(-)=s_i(-)+1$ end end [3]

The quantity of positive values $s_{i\ (+)}$ and the quantity of negative values $s_{i(-)}$ for each of the average residuals are used to determine signature elements that correspond to the residuals, e.g., $r_i$, $r_2$, $r_3$, $r_4$ and $r_5$ (72). Magnitudes of signature elements, e.g., T1(+), T1(−), T2(+), T2(−), T3(+), T3(−), T4(+), T4(−), T5(+), and T5(−) can be determined as follows.

$$\text{for} \quad [4]$$
$$i = 1, 5$$
$$\text{if}$$
$$si_{(+)} = s_{i(-)}$$
$$= 0$$
$$T_i(+) = T_i(-)$$
$$= 0$$
$$\text{else}$$
$$T_i(+) = \frac{s_{i(+)}}{N}$$
$$T_i(-) = \frac{s_{i(-)}}{N}$$

A fault signature associated with the candidate fault is determined, and includes magnitudes for some or all the signature elements, e.g., T1 (+), T1(−), T2(+), T2(−), T3(+), T3(−), T4(+), T4(−), T5(+), and T5(−) (74). The aforementioned process is repeatedly executed to generate fault signatures for all the candidate faults (76), from which a fault isolation matrix can be developed for use by the off-board fault monitoring scheme 40. Table 3 sets forth a fault isolation matrix that includes a plurality of fault signatures for each a plurality of candidate faults associated with an embodiment of an electronic returnless fuel system.

TABLE 3

| Fault Signature | Pressure sensor | Motor Resistance | Fuel Leak | Filter Blockage |
|---|---|---|---|---|
| | $T_1(-)$ | $T_1(+)$ | $T_1(-)$ | $T_1(-)$ |
| | $T_2(-)$ | $T_2(-)$ | $T_2(-)$ | $T_2(+)$ |
| | $T_3(+)$ | $T_3(+)$ | $T_3(-)$ | $T_3(-)$ |
| | $T_4(-)$ | $T_4(+)$ | $T_4(-)$ | $T_4(+)$ |
| | $T_5(-)$ | $T_5(+)$ | $T_5(-)$ | $T_5(-)$ |

The candidate fault training scheme (54) determines the fault isolation matrix 55 for each candidate fault for the selected subsystem 20 using the fault isolation database. Training includes calculating T1(+), T1(−), T2(+), T2(−), T3(+), T3(−), T4(+), T4(−), T5(+), and T5(−) under different candidate faults, and comparing with fault signatures of Table 3 to isolate each fault.

The off-board fault monitoring scheme 40 includes operations that are executed in response to operation of the subject vehicle to provide real-time analytical support to the subject vehicle. Preferably the operations execute in response to operation of the subject vehicle are coincident with operation of the subject vehicle. Operation of the vehicle subsystems 20, 20' . . . 20" is monitored and parametric data is communicated from the controller 10 of the subject vehicle 8 to the remote service center 30 off-board the vehicle (42). It is appreciated that the off-board fault monitoring scheme 40 is configured to operate in a similar manner for each of the subsystems 20, 20' . . . 20". The parametric data for the subsystem includes commanded parameters, e.g., a pulse-width-modulated (PWM) voltage command, and observed parameters that can be directly monitored, estimated, or otherwise determined, including e.g., rotational speed, current, and pressure.

The off-board fault monitoring scheme 40 employs the residual equations 53 to calculate a plurality of residuals based upon the observed states for the parameters (44). As is appreciated, each of the residuals is determined based upon an arithmetic difference between results obtained by observation or measurement and results obtained by some form of computation, e.g., employing formulae based upon physical relations of various parameters of the subsystem. Preferably, data samples representing the observed states for the parameters are collected indicating vehicle operation over a period of time. This operation is analogous to the operation of the candidate fault training scheme (54) that is described herein.

Average values for each of the residuals (e.g., $a_{v1}$, $a_{v2}$, $a_{v3}$, $a_{v4}$ and $a_{v5}$) are calculated using EQ. 2, and counters are employed to determine the quantity of positive values $s_{i(+)}$ and the quantity of negative values $s_{i(-)}$ for each of the average residuals. The quantity of positive values $s_{i\ (+)}$ and the quantity of negative values $s_{i(-)}$ are used to determine the signature elements, e.g., T1(+), T1(−), T2(+), T2(−), T3(+), T3(−), T4(+), T4(−), T5(+), and T5(−), which correspond to the residuals, e.g., $r_1$, $r_2$, $r_3$, $r_4$ and $r_5$, respectively for the observed states for the parameters(46). The signature elements, e.g., T1(+), T1(−), T2(+), T2(−), T3(+), T3(−), T4(+), T4(−), T5(+), and T5(−) are compared to a plurality of fault signatures associated with candidate faults of fault isolation matrix 55 for the selected subsystem 20 to isolate and identify presence of a candidate fault (48). This can include employing a fault isolation scheme 80, e.g., as described with reference to FIG. 1-3. The off-board fault monitoring scheme 40 communicates presence (or absence) of a fault to the controller 10 of the subject vehicle 8 (49), and the controller 10 notifies the vehicle operator of the presence (or absence) of the fault using the HMI device 12.

FIG. 1-3 shows one embodiment of a fault isolation scheme (48) that executes to isolate and identify presence of a fault for a selected subsystem. Table 4 is provided as a key to FIG. 1-3 wherein the numerically labeled blocks and the corresponding functions are set forth as follows.

TABLE 4

| BLOCK | BLOCK CONTENTS |
|---|---|
| 80 | Fault Isolation Scheme |
| 81 | Calculate fault probabilities $P_{PSf}$, $P_{Mf}$, $P_{FLf}$, $P_{FBf}$, $P_{Nf}$ |
| 82 | Is $P_{PSf} > (P_{Mf}, P_{FLf}, P_{FBf}, P_{Nf})$ |
| 83 | Pressure sensor fault |
| 84 | Is $P_{Mf} > (P_{PSf}, P_{FLf}, P_{FBf}, P_{Nf})$ |
| 85 | Motor fault |
| 86 | Is $P_{FLf} > (P_{Mf}, P_{PSf}, P_{FBf}, P_{Nf})$ |
| 87 | Fuel leak fault |
| 88 | Is $P_{FBf} > (P_{Mf}, P_{FLf}, P_{PSf}, P_{Nf})$ |
| 89 | Fuel Blockage Fault |
| 90 | No fault |

The fault isolation scheme preferably employs the signature elements, e.g., T1(+), T1(−), T2(+), T2(−), T3(+), T3(−), T4(+), T4(−), T5(+), and T5(−) to calculate fault probabilities, which can include a pressure sensor fault probability $P_{PSf}$, a motor fault probability $P_{Mf}$, a fuel leak probability $P_{FLf}$, a fuel filter blockage fault probability $P_{FBf}$, and a probability of no fault $P_{Nf}$ in one embodiment. A pressure sensor fault probability $P_{PSf}$ can be calculated as follows.

$$P_{PSf} = T_1(-) * T_3(+) * T_4(-) * T_5(+) \quad [5]$$

A motor fault probability $P_{Mf}$ can be calculated as follows.

$$P_{Mf} = T_1(+) * T_3(+) * T_4(-) * T_5(-) \quad [6]$$

A fuel leak probability $P_{FLf}$ can be calculated as follows.

$$P_{FLf} = T_1(-) * T_2(-) * T_3(-) * T_4(-) \quad [7]$$

A fuel filter blockage fault probability $P_{FBf}$ can be calculated as follows.

$$P_{FBf} = T_1(-) * T_2(+) * T_3(-) * T_4(+) \quad [8]$$

And, a no fault $P_{Nf}$ can be calculated as follows.

$$P_{Nf} = 1 - P_{PSf} - P_{Mf} - P_{FLf} - P_{FBf} \quad [9]$$

The scheme determines whether there is a pressure sensor fault (82). A pressure sensor fault is detected (83) when the pressure sensor fault probability $P_{PSf}$ is greater than a combination of the motor fault probability $P_{Mf}$, the fuel leak probability $P_{FLf}$, the fuel filter blockage fault probability $P_{FBf}$ and the probability of no fault $P_{Nf}$ (82)(1). Otherwise (82)(0), the scheme determines whether there is a motor fault (84).

A motor fault is detected (85) when the motor fault probability $P_{Mf}$ is greater than a combination of the pressure sensor fault probability $P_{PSf}$, the fuel leak probability $P_{FLf}$, the fuel filter blockage fault probability $P_{FBf}$ and the probability of no fault $P_{Nf}$ (84)(1). Otherwise (84)(0), the scheme determines whether there is a fuel leak fault (86).

A fuel leak fault is detected (87) when the fuel leak probability $P_{FLf}$ is greater than a combination of the pressure sensor fault probability $P_{PSf}$, the motor fault probability $P_{Mf}$, the fuel filter blockage fault probability $P_{FBf}$ and the probability of no fault $P_{Nf}$ (86)(1). Otherwise (86)(0), the scheme determines whether there is a fuel filter blockage fault (88).

A fuel filter blockage fault is detected (89) when the fuel filter blockage fault probability $P_{FBf}$ is greater than a combination of the pressure sensor fault probability $P_{PSf}$, the motor fault probability $P_{Mf}$, the fuel leak probability $P_{FLf}$ and the probability of no fault $P_{Nf}$ (88)(1). Otherwise (88)(0), the scheme determines that there is no fault (90).

FIG. 2 schematically depicts an embodiment of one of the subsystems 20, which is an electronic returnless fuel system (RFS) 220 configured to deliver pressurized fuel to an internal combustion engine 210 via a fuel rail 230 that is in fluid communication with engine fuel injectors. The RFS 220 is preferably configured to operate at high pressure, which may be in the range of 10-20 MPa in one embodiment. The RFS 220 is employed on a fuel tank 224 containing a supply of fuel 223 such as gasoline, ethanol, E85, or other combustible fuel. The fuel tank 224 is sealed relative to the surrounding environment and lacks a fuel return line from the fuel rail 230. The internal combustion engine 210 may be employed on a vehicle to provide torque for tractive power generation and/or electric power generation.

The RFS 220 includes a fuel pump 228, an electrically-powered pump motor 225 and a RFS controller 250, and employs other components, elements and systems as described herein. The fuel pump 228 and pump motor 225 are disposed within the fuel tank 224 and preferably submerged in fuel 223 contained therein. The pump motor 225 electrically connects to the RFS controller 250 via control line 242, with a ground path 244 returning thereto. The pump motor 225 generates and transfers mechanical power via a rotating pump shaft 226 to the fuel pump 228 in response to a pump motor control signal 256 from the RFS controller 250. The fuel pump 228 fluidly connects to the fuel rail 230 via a fuel line 229 to provide pressurized fuel to injectors of the engine 10. The fuel pump 228 is operable to pump fuel 223 to the fuel rail 230 for distribution into the internal combustion engine 10 in response to the pump motor control signal 256. The fuel pump 228 is preferably a roller vane pump or gerotor pump, and may be any suitable pump element. A fuel pressure sensor 251 is employed to monitor fuel pressure 254 in the fuel line 229. A current sensor 222 is configured to monitor electrical current 255 supplied to the pump motor 225 via control line 242. The fuel tank 224 further includes a check valve 246 and a pressure vent valve 248 disposed therein along the fuel line 229. The fuel pump 228 is electrically grounded via a ground path 244 from the pump motor 225 that includes a grounding shield 240 having a ground shield input 241 to RFS controller 250.

The RFS controller 250 signally couples to an engine control module (ECM) 205. The RFS controller 250 operatively connects to the pump motor 225 via control line 242 and signally connects to the fuel pressure sensor 251 and the current sensor 222. The RFS controller 250 generates the pump motor control signal 256 to control the pump motor 225 to operate the fuel pump 228 to achieve and/or maintain a desired fuel system pressure in response to commands from the ECM 205. The RFS controller 250 provides a reference voltage 252 to the pressure sensor 251 and monitors signal outputs from the pressure sensor 251 to determine the fuel pressure 254. The RFS controller 250 monitors the electrical current 255 and the fuel pressure 254 for feedback control and diagnostics.

The pump motor control signal 256 is a pulsewidth-modulated (PWM) voltage signal in one embodiment that is communicated via control line 242 to operate the fuel pump 228. The pump motor control signal 256 provides pulsed electrical energy to the pump motor 225 in the form of a rectangular pulse wave. The pump motor control signal 256 is modulated by the RFS controller 250 resulting in a particular variation of an average value of the pulse waveform. Energy for the pump motor control signal 256 can be provided by a battery, e.g., a DC chemical-electrical energy storage system that supplies a battery input 208 to the RFS controller 250. By modulating the pump motor control signal 256 using the RFS controller 250, energy flow to the pump motor 225 is regulated to control the fuel pump 228 to achieve a desired fuel system pressure for the fuel supplied to the fuel rail 230. The RFS 220 described herein is meant to be illustrative of one subsystem 20.

As previously mentioned, the fuel pump 228 and pump motor 225 are disposed within the fuel tank 224. The pump motor 225 is preferably a brush-type electric motor or another suitable electric motor that provides mechanical power via a rotating pump shaft 226 to the fuel pump 228. The fuel pump 228 propels fuel into the fuel line 229 to the fuel rail 230, thereby generating pressurized fuel in the fuel line 229 and the fuel rail 230, with the fuel pressure 254 monitored by the RFS controller 250 using the pressure sensor 251.

The RFS controller 250 controls the fuel pump 228 to achieve and/or maintain the desired fuel system pressure by applying closed-loop correction derived from the observed fuel pressure 254 measured by the pressure sensor 251 and the observed pump current 255 measured by the current sensor 222 as feedback. Further, the pump motor control signal 256 is monitored by the RFS controller 250. Thus, the pump parameters preferably include observed parameters including the fuel pressure 254 and the pump current 255, and commanded pump parameters including the pump motor control signal 256 when the RFS 220 is deployed on-vehicle.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, schemes, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Characterizing a subsystem includes developing relationships between commanded and observed parameters of interest by experimentally testing the subsystem under known operating and ambient conditions, and gathering and analyzing data associated therewith. Thus, characterizing the RFS 220 includes experimentally determining observable operating parameters of the RFS 220, including current, pump speed, and system pressure in response to the commanded voltage. System models are generated off-line that can be employed to determine expected states for the observed parameters based upon the commanded parameter. These are the system models 53 described with reference to FIG. 1.

FIG. 3-1 graphically shows data including pump current in relation to fuel pressure for a plurality of pump voltage commands during operation of an embodiment of the RFS 220 under standardized ambient conditions. The pump current is indicated by signal outputs from the current sensor 222, which is shown on the y-axis 302. The system pressure is indicated by signal outputs from the fuel pressure sensor 251 shown on the x-axis 304. Depicted pump motor control signals 256 have equivalent pump voltages of 6 V (310), 7 V (311), 8 V (312), 9 V (313), 10 V (314), 11 V (315), 12 V (316), 13 V (317), 14 V (318), and 15 V (319). A relationship between the pump current, system pressure, and pump voltage can be developed, as follows:

$$I_m = a_i(V)P_s + b_i(V) \quad [10]$$

wherein
  $I_m$ is expected pump current,
  $P_s$ is system pressure,
  $V$ is pump voltage, and
  $a_i$ and $b_i$ are system-specific scalar values that are experimentally and analytically determined.

The relationship of EQ. 10 is one of the system models 53 that can be employed to determine an expected pump current based upon the commanded pump voltage and the observed system pressure.

FIG. 3-2 graphically shows data including pump speed in relation to fuel pressure for a plurality of pump voltage commands during operation of an embodiment of the RFS 220 under standardized ambient conditions. The pump speed is indicated by signal outputs from a rotational sensor, which is shown on the y-axis 306. The pump speed may be directly measured using a rotational speed sensor or estimated based upon a predetermined speed relationship based upon the pump voltage, pump current and fuel pressure during off-line characterization of an embodiment of the RFS 220. The system pressure is indicated by signal outputs from the fuel pressure sensor 251 shown on the x-axis 304. Depicted pump motor control signals 256 have equivalent pump voltages of 6 V (310), 7 V (311), 8 V (312), 9 V (313), 10 V (314), 11 V (315), 12 V (316), 13 V (317), 14 V (318), and 15 V (319). A relationship between the pump speed, system pressure, and pump voltage can be developed, as follows:

$$\omega_m = a_\omega(V)P_s + b_\omega(V) \quad [11]$$

wherein
- $\omega_m$ is expected pump rotational speed,
- $P_s$ is system pressure,
- $V$ is pump voltage, and
- $a_\omega$ and $b_\omega$ are system-specific scalar values that are experimentally and analytically determined.

The relationship of EQ. 11 is another one of the system models 53 that can be employed to determine a modeled or expected system pressure based upon the commanded pump voltage and the monitored system pressure.

The off-board fault monitoring scheme 40 employs the system models 53 to determine expected states for the observed parameters based upon the commanded parameter, as previously described with reference to FIG. 1 (42). Thus, for the RFS 220, the system models 53 provided to the off-board fault monitoring scheme 40 include EQS. 2, 3, and 4, which are employed to determine expected states for the pump current ($I_m$), pump rotational speed ($\omega_m$), and system pressure ($P_m$) based upon the commanded pump voltage.

The expected states for the observed parameters of pump current ($I_m$), pump rotational speed ($\omega_m$), and system pressure ($P_{Nf}$) are compared to corresponding observed states of pump current ($I_s$), pump rotational speed ($\omega_{m\_obs}$), and system pressure ($P_s$) to calculate deviations from the expected states (43). The RFS 220 may directly monitor the pump rotational speed of the fuel pump 228, or alternatively, the RFS 220 may be configured to estimate the pump speed of the fuel pump 228 based upon a predetermined speed relationship based upon the pump voltage, pump current and fuel pressure.

FIGS. 4-1 through 4-5 each show raw data associated with operating an embodiment of the RFS subsystem 220, including pump speed (rad/sec) 410, pump voltage (V) 420, commanded pressure (kPa) 430, actual pressure (kPa) 440, pump flowrate (L/h) 450, and pump current (A) 460. FIG. 4-1 shows the aforementioned data for an RFS subsystem 220 that is operating in compliance with system specifications. FIG. 4-2 shows the aforementioned data for the RFS subsystem 220 with a pressure sensor bias fault. FIG. 4-3 shows the aforementioned data for the RFS subsystem 220 with an in-system fuel leak. FIG. 4-4 shows the aforementioned data for the RFS subsystem 220 with a blocked fuel filter. FIG. 4-5 shows the aforementioned data for the RFS subsystem 220 with a fault in the windings or commutator of the electric motor for the fuel pump. Such data can be employed by the off-line control scheme 50 to characterize the RFS subsystem 220, including developing the system models 53 and developing the fault signature described herein.

FIGS. 5-1 through 5-5 each show normalized subsystem operating signatures T1 530, T2 520, and T3 510 associated with operating an embodiment of the RFS subsystem 220 that correspond to the raw data shown with reference to FIGS. 4-1 through 4-5, respectively. FIG. 5-1 shows the normalized subsystem operating signatures T1 530, T2 520, and T3 510 for an RFS subsystem 220 that is operating in compliance with system specifications. FIG. 5-2 shows the normalized subsystem operating signatures T1 530, T2 520, and T3 510 for a pressure sensor bias fault. FIG. 5-3 shows the normalized subsystem operating signatures T1 530, T2 520, and T3 510 for an in-system fuel leak. FIG. 5-4 shows the normalized subsystem operating signatures T1 530, T2 520, and T3 510 for a blocked fuel filter. FIG. 5-5 shows the normalized subsystem operating signatures T1 530, T2 520, and T3 510 for a fault in the windings or commutator of the electric motor for the fuel pump.

A model-based detector based on residuals can be implemented to detect faults and estimate a state of health of a subsystem during real-time operation of the vehicle. An off-board algorithm and its corresponding parameters can be exported to a back-office of a remote service center. An on-vehicle telematics system is employed for periodic/event trigger communication with the service center to establish a data collection session from the subsystem that feeds it to the off-board service center for analysis. When an on-board algorithm detects unexpected behaviors, it can communicate with the remote service center, which collects data that is analyzed by the off-board control scheme for diagnosis, detection and isolation. Vehicle service can be initiated in response to the analysis by the off-board control scheme.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for monitoring a subsystem of a subject vehicle, comprising:
   when an on-board algorithm detects unexpected behavior in the subsystem, communicating subsystem data to an off-board environment;
   in the off-board environment, executing a controller-based scheme comprising:
   determining a plurality of residuals based upon expected and observed states of parameters associated with operation of the subsystem;
   determining a subsystem operating signature based upon the residuals;
   employing the subsystem operating signature to isolate a subsystem fault by comparing the subsystem operating signature to a subsystem fault isolation matrix determined in an off-line control scheme; and
   communicating the subsystem fault from the off-board environment to an on-board controller of the subject vehicle.

2. The method of claim 1, wherein determining the plurality of residuals comprises:
   developing a plurality of residual equations associated with the parameters; and
   employing the residual equations to determine the plurality of residuals based upon the expected and observed states of the parameters.

3. The method of claim 2, wherein developing the plurality of residual equations comprises developing the plurality of residual equations associated with the parameters in an off-line environment.

4. The method of claim 1, wherein determining a subsystem operating signature comprises calculating an average for each of the residuals based upon the expected and observed states of the parameters associated with operation of the subsystem over a period of time.

5. The method of claim 1, further comprising determining a fault signature associated with a candidate fault, comprising:
   developing a plurality of residual equations based upon expected and observed states of parameters associated with operation of the subsystem;

inducing the candidate fault in the subsystem and observing states of the parameters;
employing the residual equations to determine said plurality of residuals;
determining average residuals over a period of time; and
determining the fault signature associated with the candidate fault based upon the average residuals.

6. The method of claim 1, wherein employing the subsystem operating signature to isolate a subsystem fault comprises:
   employing elements of the subsystem operating signature to determine a plurality of fault probabilities associated with a plurality of candidate faults;
   determining a probability of no fault based upon the plurality of fault probabilities associated with the candidate faults; and
   isolating one of the plurality of candidate faults and no fault as the subsystem fault based upon the plurality of fault probabilities associated with the candidate faults and the probability of no fault.

7. The method of claim 6, wherein isolating one of the plurality of candidate faults and no fault comprises isolating as the subsystem fault the one of the candidate faults having a fault probability that is greater than the sum of the fault probabilities of the other candidate faults and the probability of no fault.

8. The method of claim 6, wherein isolating one of the plurality of candidate faults and no fault comprises isolating as the subsystem fault the no fault condition when the probability of no fault is greater than the sum of the fault probabilities of the candidate faults.

9. A method for monitoring a subsystem of a subject vehicle, comprising:
   in an off-line environment, executing a controller-based scheme including developing a plurality of residual equations associated with the subsystem;
   observing parameters of the subsystem on-vehicle and when an on-board algorithm detects unexpected behavior in the subsystem, communicating observed states of the parameters to an off-board system; and
   executing a controller-based scheme in the off-board system, including:
      employing the residual equations to determine a plurality of residuals based upon expected states and the observed states of the parameters;
      determining a subsystem operating signature based upon the residuals;
      employing the subsystem operating signature to isolate a subsystem fault by comparing the subsystem operating signature to a subsystem fault isolation matrix determined in the off-line environment; and
      communicating the subsystem fault from the off-board system to the subject vehicle.

10. The method of claim 9, wherein determining a subsystem operating signature comprises calculating an average for each of the residuals based upon the expected and observed states of the parameters associated with operation of the subsystem over a period of time.

11. The method of claim 9, further comprising determining a fault signature associated with a candidate fault, including:
   developing a plurality of residual equations based upon expected and observed states of parameters associated with operation of the subsystem;
   inducing the candidate fault in the subsystem and observing states of the parameters;
   employing the residual equations to determine said plurality of residuals;
   determining average residuals over a period of time; and
   determining the fault signature associated with the candidate fault based upon the average residuals.

12. The method of claim 9, wherein employing the subsystem operating signature to isolate a subsystem fault comprises:
   employing elements of the subsystem operating signature to determine a plurality of fault probabilities associated with candidate faults;
   determining a probability of no fault based upon the plurality of fault probabilities associated with the candidate faults; and
   isolating a subsystem fault based upon the plurality of fault probabilities associated with the candidate faults and the probability of no fault.

13. The method of claim 9, wherein employing the subsystem operating signature to isolate a subsystem fault comprises:
   employing elements of the subsystem operating signature to determine a plurality of fault probabilities associated with a plurality of candidate faults;
   determining a probability of no fault based upon the plurality of fault probabilities associated with the candidate faults; and
   isolating one of the plurality of candidate faults and no fault as the subsystem fault based upon the plurality of fault probabilities associated with the candidate faults and the probability of no fault.

14. The method of claim 13, wherein isolating one of the plurality of candidate faults and no fault comprises isolating as the subsystem fault the one of the candidate faults having a fault probability that is greater than the sum of the fault probabilities of the other candidate faults and the probability of no fault.

15. The method of claim 13, wherein isolating one of the plurality of candidate faults and no fault comprises isolating as the subsystem fault the no fault condition when the probability of no fault is greater than the sum of the fault probabilities of the candidate faults.

16. A method for monitoring a subsystem of a subject vehicle, comprising:
   in an off-line environment, executing a controller-based scheme including developing a plurality of residual equations associated with the subsystem;
   communicating subsystem parameters to an off-board system when an on-board algorithm detects unexpected behavior in the subsystem; and
   executing a controller-based scheme in the off-board system, including:
      determining a plurality of residuals based upon expected states and observed states of the subsystem parameters;
      determining a subsystem operating signature based upon the residuals;
      employing the subsystem operating signature to isolate a subsystem fault by comparing the subsystem operating signature to a subsystem fault isolation matrix determined in the off-line environment; and
      communicating the subsystem fault from the off-board system to the subject vehicle.

\* \* \* \* \*